INVENTOR.
FRANZ JAKOB
JOACHIM SPATZ

United States Patent Office 3,270,647
Patented Sept. 6, 1966

3,270,647
OBJECTIVE-FOCUSING APPARATUS
Franz Jakob, Unterhaching, Munich, and Joachim Spatz, Munich, Germany, assignors to Agfa Aktiengesellschaft, Leverkusen, Germany
Filed June 10, 1964, Ser. No. 374,115
Claims priority, application Germany, June 21, 1963, A 43,383
17 Claims. (Cl. 95—44)

The present invention relates to devices such as cameras, which may be either still or motion picture cameras, and which have objectives which must be properly focused on a given subject in order to provide a sharp image.

In particular, the present invention relates to that type of camera which has a picture-taking objective which is coupled with an auxiliary view finder objective, for example, in such a way that focusing of the latter objective will focus the picture-taking objective, and which has a pair of crossed prisms situated behind the auxiliary objective approximately in a plane which is equivalent to the focal plane of the latter objective. With such construction a subject seen through the prisms appears uninterrupted only when the prisms are precisely situated in a focal plane for the subject.

Structures of this latter type are known. With such structures an optical system, composed, for example, of glass and/or reflecting elements, projects into the focal plane a sharp real image of a subject situated at infinity or at a distance less than infinity. When there is situated either in or near the focal plane of such system a pair of crossed prisms, having the configuration of a pair of optical wedge members, for example, as is well known in the so-called split-image range finders, then, when viewing the contour of a given subject through the prisms this contour will appear either continuous or symmetrically split depending upon the adjustment. If the focal length of the optical viewing system is large enough with respect to the focal length of the picture-taking objective, it is possible to provide with the crossed wedge-shaped prisms of the optical viewing system an image of only a small section of the subject which is to be photographed.

One of the objects of the present invention is to provide for a system of the above type a structure capable of focusing the picture-taking objective to guarantee a sharp photograph.

Another object of the present invention is to provide a structure of the above type which lends itself either to fully automatic focusing of the picture-taking objective or to automatically provide an indication to the operator, other than the conventional matching of the split portions of a split-image range finder, of when the objective is precisely focused on the subject.

A further object of the present invention is to provide a structure of the above type which is composed of simple reliably operating components which can conveniently form part of a still or motion picture camera.

In addition, it is an object of the invention to provide a structure of the above type which will provide precise focusing even where the subject to be photographed has a complex contour including a plurality of light and dark areas with a plurality of lines separating said areas and capable of providing incorrect focusing were it not for the present invention.

With the above objects in view the invention includes, in an apparatus for focusing an objective, a pair of identical crossed prisms situated approximately at a plane which is the equivalent of the focal plane of the objective to provide an uninterrupted contour of a subject viewed through the prisms when the latter are precisely situated at a focal plane of the objective for the particular subject. In accordance with the invention, a pair of identical photosensitive transducers are respectively situated behind the prisms and have not only identical electrical properties but also the same sizes and locations relative to the prisms. These transducers are electrically connected into a balancing circuit which includes, for example, an electrical instrument such as a galvanometer capable of indicating when balance is achieved, and with the structure of the invention, when balance is achieved the objective will be precisely focused on the subject, as will be apparent from the description which follows.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 schematically illustrates a subject which is to be photographed and the light distribution on a pair of photosensitive transducers, such as photocells, for example, when the system is not properly focused;

FIG. 2 schematically illustrates the structure of FIG. 1 when it is precisely focused on the subject;

Figure 1:
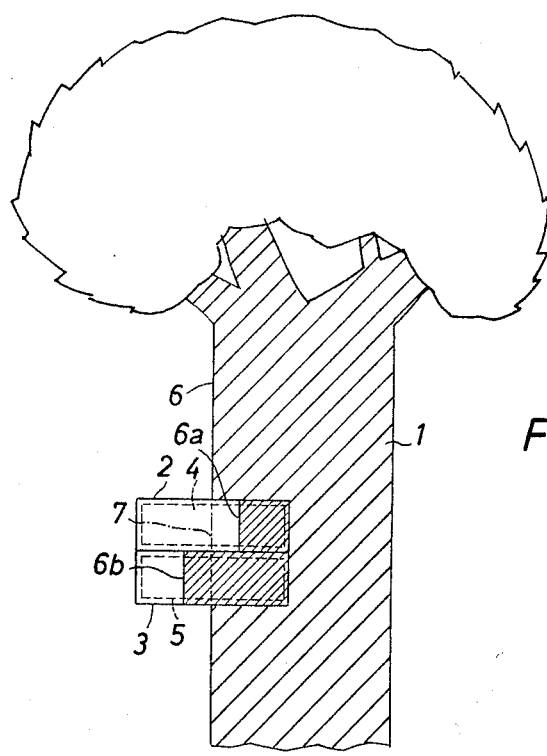
Figure 2:
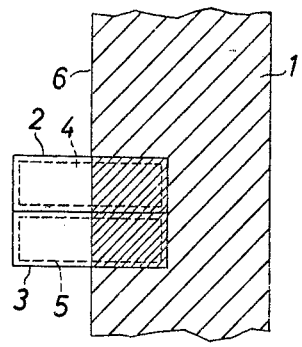

Referring now to FIGS. 1 and 2, there is schematically illustrated therein a subject 1 which is to be photographed. FIGS. 1 and 2 illustrate a pair of identical cross prisms 2 and 3 of known construction which form part of a viewing assembly for viewing the subject, and when the picture-taking objective or viewer objective are set at infinity they are situated at a distance equal to the focal length from the crossed prisms 2 and 3. For the sake of clarity, the objectives are not illustrated. Behind the prisms 2 and 3, at the side thereof directed away from the subject 1, are located a pair of identical photosensitive means 4 and 5 which may be either photocells or photosensitive resistors, and these photosensitive means 4 and 5 not only have identical electrical properties but in addition they have the same sizes and locations relative to the crossed prisms 2 and 3. The sensitive surface areas of the photosensitive means 4 and 5 are somewhat smaller than the areas of the crossed prisms 2 and 3 which are directed toward the pair of photosensitive means 4 and 5. As is apparent from FIGS. 1 and 2, the pair of photosensitive transducers 4 and 5 are respectively arranged in an identical manner with respect to the prisms 2 and 3.

During focusing of the camera on the subject, the camera is held in such a way that a line 6 of the subject defining the junction between light and dark areas thereof passes vertically through the optical axis of the objective, so that this line 6 coincides with the vertical central line 7 of the prisms 2 and 3 (FIG. 1). In the event that the objective is not precisely focused on the subject so that a sharp image does not form at the focal plane where the prisms 2 and 3 are located, then line 6 is split to provide the lines 6a and 6b symmetrically situated with respect to the vertical line 7, and this is what the operator sees when viewing the subject through the prisms. Of course, with the structure of the invention the light which passes through the prisms will fall on the pair of transducers 4 and 5 with the result that the transducer 4 will have its sensitive area divided into light and dark portions where the light portion is substantially greater than the dark portion, whereas the sensitive area of the transducer 5 will be divided also into light and dark portions but the dark portion will be greater than the light portion.

Figure 4:
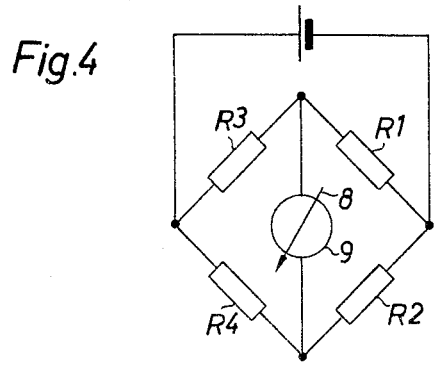
FIG. 4 shows a balancing circuit capable of being used with the embodiments of FIGS. 1–3.

Referring now to FIG. 4, the pair of transducers 4 and 5, assuming that they are in the form of photosensitive resistors, are connected into a balancing circuit as shown in FIG. 4 where the transducers 4 and 5 form the variable resistors R1 and R2. In the balancing bridge circuit shown in FIG. 4 these variable resistors are electrically connected with a pair of fixed resistors R3 and R4, so that when the resistances of the resistors R1 and R2 are unequal, as inevitably will be the case with the lack of focus shown in FIG. 1, the pointer 8 of the zero instrument 9, in the form of a galvanometer, for example, will be deflected away from its zero position. Thus, the balancing bridge circuit of FIG. 4 will show that the resistances of the resistors R1 and R2 are unbalanced and therefore that the camera is not properly focused.

If the objective is adjusted so as to form a sharp image of the subject 1 on the prisms 2 and 3, then the line 6 will not be interrupted and the contour of the subject 1 will appear, in the manner illustrated in FIG. 2, without interruption, so that the line 6 now coincides with the line 7 and the light and dark areas of each of the transducers 4 and 5 are equal so that in this case the currents flowing through the transducers 4 and 5 are also equal, and now the pointer 8 of the meter 9 will be in its zero position. Of course, the transducers need not be in the form of variable resistors. They can take the form of photocells, and the balancing circuit can operate with currents or voltages rather than resistances.

Thus, in order to properly focus the objective it is necessary to sight on a line 6 separating light and dark areas of the subject and to place such a line 6 in a position coinciding with the central line 7 of the prims 2 and 3, and then the auxiliary objective, such as the view finder objective, can be adjusted either by hand or by motor until the instrument 9 is zeroed so that the operator knows that the objective is now properly focused. Where the objective is driven by a motor it is possible to control the motor in such a way, for example, that the switch which closes in order to energize the motor is automatically opened when the instrument 9 reaches its zero position. With such an arrangement it is advisable to provide either an electrical or mechanical device for automatically returning the objective to a predetermined starting position after each exposure. In the case of a mechanical device, a simple return spring will suffice, and preferably the starting position is one where the objective is at its infinity position, the objective being either turned or simply axially displaced in order to reach this position. In a reflex camera of the single-lens type, the picture-taking objective will also function as the viewing objective and the prisms 2 and 3 and transducers 4 and 5 will be situated in part of the light beam which is reflected from the optical axis of the objective, although it is also possible to use with such a camera a beam splitter which deflects part of the beam from the optical axis to the prisms 2 and 3 and the transducers 4 and 5. However, it is also possible to use the prisms 2 and 3 and the transducers 4 and 5 in the view finder of a twin-lins reflex camera directly in the path of the view finder light rays or in the path of light deflected from the optical axis of the view finder so that the view finder image will not be affected. This latter type of arrangement is particularly suitable for providing additional optical elements having a desirably long focal length.

The pointer 8 and the zero index with which it cooperates can be visible at a suitable window or an image of the pointer 8 and the index with which it cooperates can be reflected into the view finder of the camera. It is also possible to reflect these images with beam splitters or tiltable reflectors in cameras which in the classical sense are not reflex cameras, or it is possible to use an optical system completely separate from the camera objective.

In some cases the subject will have several lines at the junctions between contrasting light and dark areas of the subject, and these lines may all be visible through the prisms 2 and 3 so that a clear unmistakable setting obtainable with a subject as shown in FIGS. 1 and 2 cannot reliably be achieved. In other words, under these circumstances, the balancing of the light transducers 4 and 5 can be, with respect to distances between subject and camera, different from the desired distance. In order to avoid this disadvantage the structure of FIG. 3 can be used. With this embodiment the sensitive surfaces of the transducers 4 and 5 are divided into several individual areas which are interrelated with each other. The pair of transducers 4 and 5 for a given camera must in this case also be precisely the same with respect to the size and positions of their sensitive surfaces. These surfaces can be divided into elongated strip-shaped portions or into areas of any desired, even irregular configuration, as indicated at 10 in FIG. 3, and these areas can be formed by partial covering of the sensitive transducer surfaces or by placing in front of the transducer surfaces suitable filters having the configurations shown in the shaded areas of FIG. 3.

Figure 6:
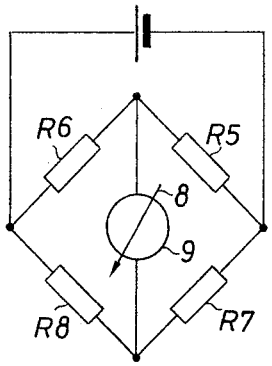
FIG. 6 shows a balancing circuit for the photocells of FIG. 5.
Figure 5:
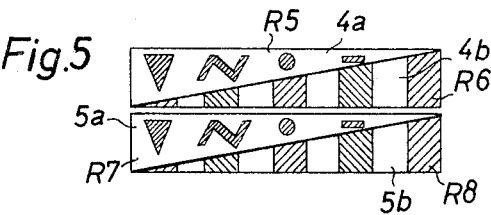
FIG. 5 shows another embodiment of photocells according to the invention.

A further improvement of the accuracy and reliability of the structure of the invention can be achieved with an arrangement as shown in FIG. 5 where the transducers 4 and 5 are each divided into a pair of transducers 4a, 4b and 5a, 5b providing four variable resistances R5–R8, respectively, capable of being connected into a balancing circuit as illustrated in FIG. 6. The division of each of the transducers can be along a horizontal center line, a vertical center line, or a diagonal as shown in FIG. 5, so that the areas into which each transducer is divided are equal to each other. In this case the four resistances form the individual resistances of the bridge circuit shown in FIG. 6. It is to be noted that in FIG. 5 the separate areas of each transducer are divided by suitable cover members, filters or the like, into the individual, interrelated areas as shown in FIG. 5 where the separate sensitive areas of the transducer portions 4a and 4b will be different from each other but where the areas 4a and 5a are identical while the areas 4b and 5b are identical. Instead of using the four variable resistors of FIG. 5 as the only resistors of the balancing circuit, as shown in FIG. 6, it is also possible to arrange the resistors R5 and R7 in a separate balancing circuit and the resistors R6 and R8 also in a separate balancing circuit, so that when proper focusing is achieved both of the bridge circuits must simultaneously be zeroed (in balance). It is to be noted that the identical surface areas 4a and 5a have non-uniform individual areas, and the same is of course true of the identical transducer areas 4b and 5b. Furthermore, the difference between the covered and uncovered areas of one pair of transducer sections, such as the sections 4a and 5a, for example, can be a simple contrast between black and white, while the remaining transducer sections 4b and 5b can have their distinct area portions formed by filter strips situated in front of the sections 4b and 5b and having various colors which of course are identically arranged in the pair of transducer sections 4b and 5b.

Figure 3:
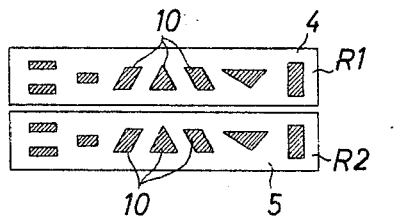
FIG. 3 shows one possible embodiment of photocells of the invention.

With arrangements as shown in FIGS. 3 and 5 it is possible to provide an accurate focusing even if there are several lines such as the line 6 of FIGS. 1 and 2 separating contrasting areas of the subject.

The focusing structure of the invention is particularly suitable for use with a camera having an objective which is adjusted with known crossed prisms by a line of the subject situated between light contrasting areas of the subject. Of course, while the subject 1 shown in FIGS. 1 and 2 is a tree, it can also be a person or any other desired subject.

Of course, while mention has been made above of controlling a motor driven objective through a suitable switch of an electrical circuit, other electrical controls such as amplifiers and the like may be used. It is only required that the drive of the objective continue until both of the transducers have the same electrical values, indicating that the objective has been focused. Where the camera has a picture-taking objective and a view finder objective, the view finder objective can be coupled through a suitable mechanical transmission with the picture-taking objective so as to automatically focus the camera, and it is clear that the structure of the invention can be used either with a still camera or with a motion picture camera. Naturally, where the meter 9 or an image thereof is visible to the operator the adjustments may be carried out by hand. With the arrangements shown in FIGS. 3 and 5 the probability of proper focusing for the correct distance between subject and camera is greatly increased as compared with transducers as illustrated in FIGS. 1 and 2. The use of filters of different colors as described above in connection with FIG. 5 of course increases this probability appreciably. Furthermore, the use of four transducer areas as also shown in FIG. 5 increases the probability of correct focusing even further. Where the transducers of FIG. 5 are arranged in a pair of balancing bridge circuits, as mentioned above, the accuracy will be greater than the arrangement shown in FIG. 6. Moreover, where the pointer is visible in the view finder as by having an image thereof projected into the view finder, the view finder can carry an index with which the pointer cooperates. In simple still or motion picture cameras the structure of the invention is preferably associated with the view finder, while in reflex cameras part of the beam which passes through the objective is used with the structure of the invention.

It will be understood that each of the elements described above, or two or more together, may also find a useful application in other types of cameras differing from the types described above.

While the invention has been illustrated and described as embodied in camera focusing structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an objective-focusing apparatus, in combination, a pair of identical crossed prisms located adjacent each other but on opposite sides of an optical axis of the apparatus and situated approximately in a plane which is the equivalent of the focal plane of the objective which is to be focused, so that when the contour of a given subject is seen through the crossed prisms, the contour will only appear to be uninterrupted when the prisms are precisely situated in the focal plane of the objective for the subject; and a pair of photosensitive transducers respectively situated behind said crossed prisms and respectively being identical insofar as their electrical properties and sizes and positions relative to said prisms are concerned and the outline of said pair of transducers in a plane normal to said optical axis being substantially identical in size and shape to the outline of said pair of crossed prisms in a plane normal to said optical axis.

2. In an objective-focusing apparatus wherein the focal plane is movable between a plurality of positions, in combination, a pair of identical crossed prisms located in the region of the focal plane of the objective which is to be focused and providing an uninterrupted contour of a given subject seen through the prisms only when the prisms are, in response to displacement of the focal plane, precisely situated in the such focal plane of the objective for the particular subject; and a pair of photosensitive transducers respectively situated behind said prisms substantially fixed in position with respect to said prisms, and having identical electrical properties and with respect to said prisms the same sizes and positions, respectively, said prisms, when providing an uninterrupted contour of a given subject which has a contour line separating dark and light areas of the subject, providing on said photosensitive transducers equal dark and light fields.

3. In an objective-focusing apparatus wherein the focal plane is movable between a plurality of positions, in combination, a pair of crossed prisms located behind the objective which is to be focused approximately in the focal plane of the objective, said crossed prisms being identical and providing an uninterrupted contour of a subject viewed through the prisms when in response to displacement of the focal plane the prisms are precisely situated in such focal plane of the objective for the particular subject; a pair of identical photosensitive transducers respectively situated behind said prisms and having not only identical electrical properties but also the same sizes and locations relative to said prisms; and balancing circuit means electrically connected with said pair of transducers for measuring the currents passing therethrough and detecting when said currents are equal, said balancing circuit means being operatively connected to an objective-focusing device to indicate when the objective is properly focused on a subject whose image is received by said pair of transducers.

4. In an apparatus as recited in claim 3, said balancing circuit means being a balancing bridge circuit.

5. In an apparatus as recited in claim 4, said transducers forming a pair of resistors in said circuit and said circuit including a pair of additional resistors which compensate for electrical differences between said transducers.

6. In an optical apparatus wherein the focal plane is movable between a plurality of positions for indicating when a manually adjustable objective is focused on a given subject, in combination a fixed pair of identical crossed prisms through which the subject is viewed, said prisms being situated in the region of the focal plane of the objective and providing an uninterrupted contour of the viewed subject when in response to displacement of the focal plane said prisms are precisely situated at the focal plane of the objective for the particular subject; a pair of fixed identical photosensitive transducers respectively situated behind said prisms and having the same sizes and positions relative to said prisms, respectively, as well as identical electrical properties; balancing circuit means connected electrically with said transducers; and electrical measuring means connected electrically with said circuit means for indicating to the operator when said transducers are balanced, so that when the operator manually adjusts the objective until the focal plane coincides with a cross sectional plane of the prisms said measuring means indicates that said transducers are balanced and the operator knows that the objective is properly focused on the subject.

7. In an apparatus for focusing an objective which is driven by an electric motor to move the focal plane thereof for a given subject between a plurality of positions, in combination, a pair of fixed identical crossed prisms located approximately at a plane which is equivalent to a focal plane of the objective for providing an uninterrupted contour of a subject viewed through the prisms when the latter are situated in response to displacement of the focal plane precisely at a focal plane of the objective; a pair of fixed identical photosensitive transducers respectively situated behind said prisms and having not only identical electrical properties but also identical sizes and locations with respect to said prisms, respectively; balancing circuit means electrically connected with said transducers; and electrical means connected electrically with said circuit means and said motor for actuating the latter to drive the objective until the latter is properly focused on a given subject.

8. In an apparatus as recited in claim 7, said balancing circuit means being a bridge circuit having a portion in which no current flows when balance is achieved, and said electrical means being a direct current relay located in said portion of said bridge circuit for maintaining the motor energized until balance is achieved.

9. In a camera having a picture-taking objective and a viewing objective coupled to the picture-taking objective for focusing the latter simultaneously with focusing of the viewing objective on a given subject with the focal plane of the viewing objective being movable between a plurality of positions in response to movement of the latter, in combination, a pair of fixed identical crossed prisms located behind the viewing objective in the region of the focal plane of said viewing objective for providing an uninterrupted contour of a subject viewed through said prisms when the latter are in response to displacement of the focal plane precisely situated at the focal plane of the viewing objective for the given subject viewed through said prisms; a pair of fixed identical photosensitive transducers respectively situated behind said prisms and having not only identical electrical properties but also the same sizes and locations relative to said prisms, respectively; and balancing circuit means operatively connected to said transducers for indicating when the latter are electrically balanced so that during focusing of said viewing objective to achieve electrical balance, the picture-taking objective will be properly focused on the subject.

10. In an apparatus having an optical system having a focal plane movable between a plurality of positions for focusing an objective which is automatically returned to a given starting position, preferably focused at infinity, after each exposure, in combination, a pair of identical crossed prisms situated in the region of the focal plane of the objective which is to be focused, so that when the contour of a given subject is seen through the crossed prisms, the contour will only appear to be uninterrupted when the prisms in response to displacement of the focal plane precisely situated in the focal plane of the objective for the subject; and a pair of photosensitive transducers respectively situated behind said crossed prisms and respectively being identical insofar as their electrical properties and sizes and positions relative to said prisms are concerned.

11. In an apparatus for focusing an objective, in combination, a pair of identical crossed prisms located adjacent each other but on opposite sides of an optical axis of the apparatus approximately at a plane equivalent to the focal plane of the objective and providing an uninterrupted contour of the subject viewed through said prisms when the latter are precisely situated at a focal plane of the objective for the subject; and a pair of identical photosensitive transducers respectively situated behind said prisms and having not only identical electrical properties but also the same sizes and locations with respect to said prisms, respectively, said transducers being respectively identically covered at individual areas of any selected configuration which have the same relationship with respect to each other and the outline of said pair of transducers in a plane normal to said optical axis being substantially identical in size and shape to the outline of said pair of crossed prisms in a plane normal to said optical axis.

12. In an apparatus for focusing an objective, in combination, a pair of identical crossed prisms respectively situated approximately in a plane equivalent to a focal plane of the objective and providing an uninterrupted contour of the subject viewed through said prisms when the latter are precisely situated at a focal plane of the objective for the subject; and a pair of identical photosensitive transducers respectively situated behind said prisms and having not only identical electrical properties but also the same sizes and locations relative to said prisms, respectively, said photosensitive transducers each being divided into a pair of sections of equal area but different electrical properties so that the identical transducers form two pairs of identical sections which have different electrical properties.

13. In an apparatus as recited in claim 12, one of said pairs of identical sections of said transducers having their areas interrupted by color filters situated in front of said areas.

14. In an apparatus for focusing the objective of a reflex camera which deflects part of a light beam passing through the objective along a path directed away from the optical axis of the objective and including an optical system adapted to move the focal plane thereof for a given subject between a plurality of positions, in combination, a pair of identical crossed prisms respectively situated in said path approximately at a focal plane of the objective for providing an uninterrupted contour of a subject viewed through the prisms when the latter are in response to displacement of the focal plane situated precisely at a focal plane of the objective for the subject; and a pair of identical photosensitive transducers respectively situated behind said prisms and respectively having not only identical electrical properties but also the same sizes and locations relative to said prisms.

15. In an apparatus for focusing the objective of a camera which has an adjustable view finder along whose optical axis a light beam travels, in combination, a pair of identical crossed prisms situated in light of said light beam approximately at a focal plane of the objective for providing an uninterrupted contour of a subject viewed through the prisms when the latter are precisely situated at the focal plane of the objective for the subject; and a pair of photosensitive transducers respectively situated behind said prisms and respectively having not only identical electrical properties but also the same sizes and locations relative to said prisms, said prisms being located in light reflected from the optical axis of the view finder.

16. In an apparatus for focusing an objective of a camera which has a view finder, in combination, a pair of identical crossed prisms respectively situated approximately at a plane equivalent to the focal plane of the objective for providing an uninterrupted contour of a subject viewed through said prisms when the latter are precisely situated at the focal plane of the objective for the subject; a pair of identical photosensitive transducers respectively situated behind said prisms and having not only identical electrical properties but also the same sizes and locations relative to said prisms, respectively; and balancing circuit means electrically connected with said transducers and including an indicator which indicates when balance is achieved, at least portions of said indicator being located in the field of view of the operator of the camera.

17. In an apparatus as recited in claim 16, said indicator including a movable pointer and a zero index visible to the operator and with which said pointer cooperates to indicate by alignment with said index when balance is achieved.

References Cited by the Examiner

UNITED STATES PATENTS

| | | | |
|---|---|---|---|
| 2,968,994 | 1/1961 | Shurcliff | 88—24 |
| 3,054,898 | 9/1962 | Westover | 88—1 |
| 3,143,588 | 8/1964 | Donald | 88—1 |
| 3,185,059 | 5/1965 | Durst | 95—44 |

JOHN M. HORAN, *Primary Examiner.*